US006804566B1

(12) United States Patent
Colomes et al.

(10) Patent No.: US 6,804,566 B1
(45) Date of Patent: Oct. 12, 2004

(54) METHOD FOR CONTINUOUSLY CONTROLLING THE QUALITY OF DISTRIBUTED DIGITAL SOUNDS

(75) Inventors: Catherine Colomes, Domloup (FR); Stéphane Pefferkorn, Rennes (FR); Thierry Alpert, Thorigne Fouillard (FR); Eric Monteux, Rennes (FR)

(73) Assignees: France Telecom, Paris (FR); Telediffusion de France, Paris (FR)

( * ) Notice: Subject to any disclaimer, the term of this patent is extended or adjusted under 35 U.S.C. 154(b) by 146 days.

(21) Appl. No.: 10/089,699

(22) PCT Filed: Sep. 28, 2000

(86) PCT No.: PCT/FR00/02681

§ 371 (c)(1), (2), (4) Date: May 30, 2002

(87) PCT Pub. No.: WO01/26423

PCT Pub. Date: Apr. 12, 2001

(30) Foreign Application Priority Data

Oct. 1, 1999 (FR) ........................................... 99 12296

(51) Int. Cl.[7] .......................... G06F 17/00; H04R 29/00

(52) U.S. Cl. ........................................... 700/94; 381/56

(58) Field of Search .................... 700/94; 704/500–504, 704/205, 211, 265, 267, 200.1; 381/56

(56) References Cited

U.S. PATENT DOCUMENTS 6,233,550 B1 * 5/2001 Gersho et al. .............. 704/208

FOREIGN PATENT DOCUMENTS

EP 0 610 975 8/1994

OTHER PUBLICATIONS

International Search Report for International Application No. PCT/FR00/02681, report dated Dec. 11, 2000.

* cited by examiner

*Primary Examiner*—F. W. Isen
*Assistant Examiner*—Elizabeth McChesney
(74) *Attorney, Agent, or Firm*—Marshall, Gerstein & Borun LLP

(57) ABSTRACT

The invention concerns a method for continuously controlling the quality of distributed digital sounds broadcast by radio or television on a digital channel. The method consists in temporally breaking down the digital signal into sequences of samples; carrying out a spectral analysis of each sequence to observe the variations in energy and envelope of the digital signal and calculating a global quality index; and in calculating on the basis of the global quality index, a final gated and continuous quality index representing the quality of the digital signals. The invention is applicable to the continuous control of the quality of distributed sounds.

9 Claims, 10 Drawing Sheets

METHOD FOR CONTINUOUSLY CONTROLLING THE QUALITY OF DISTRIBUTED DIGITAL SOUNDS

FIELD OF INVENTION

The invention relates to a method for continuous monitoring of the quality of digital sound on distribution.

BACKGROUND OF THE INVENTION

The digitalaudio coding processes used by radio- or TV-broadcasting services have made it possible to reduce the quantity of data to be transmitted. However, this reduction is liable to entail an irremediable loss of the quality of the sound by comparison with the original source signal.

The extent of the defects engendered depends simultaneously on the throughput allocated for the coder, on the complexity of the content of the sound signal, as well as on problems relating to the transmission of the signal.

For technical reasons or reasons of broadcasting responsibility, it is necessary to evaluate the quality level of the audio signal continuously. Subjective methods for evaluation of equipment, by human assessment and surveillance, are cumbersome to implement, and scarcely reliable. In particular, among the more specific drawbacks of the processes or methods of the prior art, mention may be made of:

- the implementation of lengthy and expensive subjective evaluations;
- the lack of completeness of the information which is necessary to carry out the monitoring of the perceived sound quality, when this information is supplied by the binary-stream analyzers;
- the lack of objective analysis of the sound content, which alone is capable of reflecting the final quality of the perceived sound signals;
- the defects inherent in differential analysis, such as:
  - making available the noncoded source, as a reference source;
  - sequences analyzed being of short duration, 20 seconds at most, which are not representative of the service analyzed;
  - transparency of certain defects to this type of analysis;
  - analysis being generally discontinuous, and not completely meaningful.

In particular, the processes of differential analysis, which are based on the human hearing system, between a reference sound source and the sound source to be evaluated, may allow automatic implementation. However, this solution appears to be impractical since it is necessary to have the reference sound source available.

OBJECTS OF THE INVENTION

The object of the present invention is to remedy the abovementioned drawbacks of the processes or methods of the prior art, by the implementation of a method based on a close study of the digital signal and of the continuous behavior thereof, so as, on the basis of conventional methods, to make it possible to assess the overall quality level of the signal.

The methods for continuous monitoring of the quality of sound on distribution, which is the object of the present invention, this digital sound being available in stereophonic mode with a digital signal representing at least one right-hand channel and one left-hand channel, consists in carrying out a statistical analysis of the content of this digital signal on each of these channels. The statistical analysis consists in segmenting the digital signal in the time domain into successive series of samples, including a defined number of samples, and, when a program of digital sounds is present, carrying out a spectral analysis of each of the series of samples in order to observe the variations in energy and in envelope of the digital signal in the time and frequency domains, and to calculate an overall quality index. A final quality index is calculated on the basis of the variations in energy and in envelope and of the overall quality index, in the form of a bounded value which is continuous in time, this final quality index being representative of the quality of the digital sound perceived.

The method, which is the subject of the present invention, finds an application to the operational and continuous surveillance of the sound components of audio and audiovisual services, before and after secondary distribution especially, to services for inspection of equipment, coders and multiplexers, for inspection of the quality of service, experimental platforms.

BRIEF DESCRIPTION OF THE DRAWINGS

This method, the subject of the present invention, will be better understood on reading the description and on perusing the drawings below, in which.

MORE DETAILED DESCRIPTION

A more detailed description of the method for continuous monitoring of the quality of digital sound on distribution, which is the subject of the present invention, will now be given in connection with FIGS. 1*a*, 1*b* and the subsequent figures.

In a general way, it is indicated that the method which is the subject of the present invention makes it possible to obtain a bounded, quality-index value, stretching, for example, between two upper limits of quality, excellent to poor, this bounded value being continuous in time and indicative of the quality of the sound system. By time-continuous value is meant, needless to say, that this value in fact consists of successive discrete values calculated over time intervals which are sufficiently short for these successive values to be representative of a quality value considered as being continuous in time.

Figure 1A:
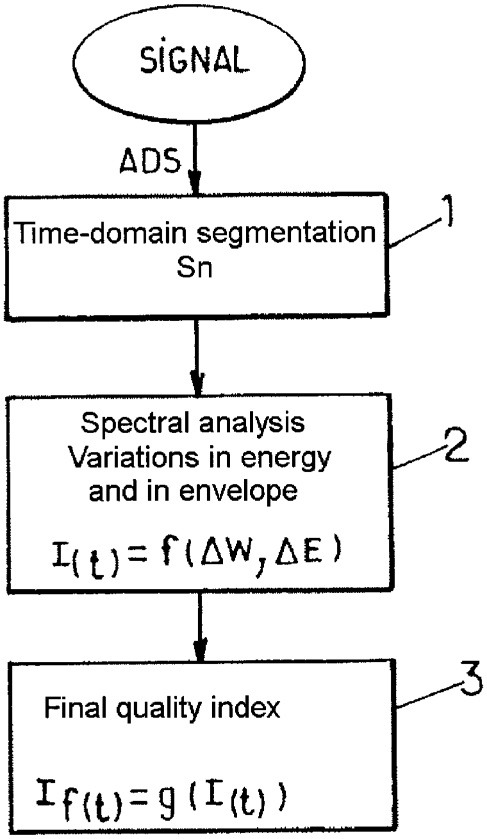
FIG. 1*a* represents, in the form of a block diagram, a general flow chart for the method of continuous monitoring of the quality of the digital sound on distribution, which is the subject of the present invention.

As has been represented in FIG. 1*a,* the method which is the subject of the invention applies to digital sound, which is available in stereophonic mode in terms of a digital signal, denoted ADS, representing at least one right-hand channel and one left-hand channel, the method which is the subject of the present invention possibly being applied, as appropriate, to quadraphonic or other sound signals.

In a general way, the method which is the subject of the present invention consists in carrying out a statistical analysis of the content of the abovementioned digital signal on each of the channels. By reference to FIG. 1*a,* the statistical analysis may consist, at a stage 1, in segmenting the digital signal in the time domain into successive series of samples, $S_n$, including a defined number of samples, then, at a stage 2, in carrying out a spectral analysis of each of the series of samples in order to observe the variations in energy, denoted ΔW, and in envelope, denoted ΔE, of the digital signal in the time and frequency domain, and in calculating an overall quality index I(t)=f(ΔW, ΔE) on the basis of the variations in energy and in envelope.

The abovementioned stages are followed by a stage 3 consisting in calculating, on the basis of the variations in energy and in envelope and of the overall quality index I(t), a final quality index, denoted $I_f(t)$, which consists of a bounded and time-continuous value. This index is representative of the quality of the abovementioned digital signals.

As far as the time-segmentation stage 1 is concerned, it is indicated that the series of samples may consist of series of samples featuring a degree of overlap which is a ratio of the number of samples common to two consecutive series $S_{n-1}$, $S_n$ to the number of samples constituting each series of samples, this degree possibly lying between 0 and 75%. It is indicated, in particular, that the abovementioned time segmentation may be carried out by sequential memory-storage of these series of samples then a rereading, memory-stored sample by memory-stored sample, the rereading process being carried out by overlapping addressing of the successive samples in order to achieve the degree of overlap in question.

Figure 1B:
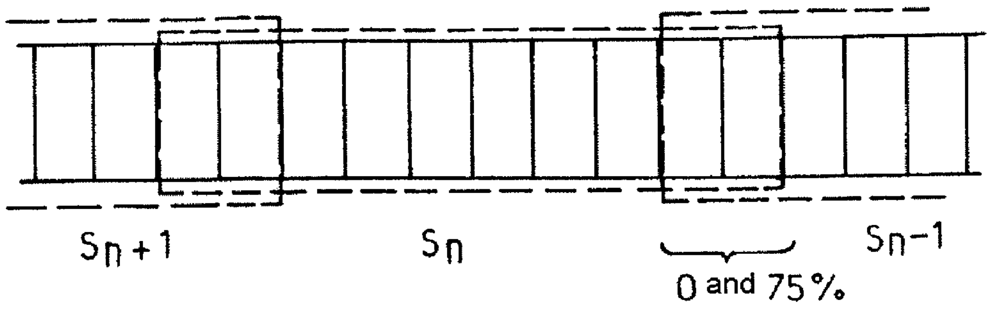
FIG. 1*b,* purely by way of illustration, represents a process for creation of series of samples of the digital signal, allowing implementation of the method which is the subject of the present invention.

In FIG. 1*b,* by way of illustration, the successive series of samples have been represented, the successive series $S_{n-1}$, $S_n$, $S_{n+1}$ overlapping by two samples per hundred, for example.

A more detailed description of the stages 2 of spectral analysis of variations of energy and of envelope and of calculation of an overall quality index, and stage 3 of calculation of final-quality index on the basis of the variations in energy and in envelope ΔW and ΔE and of the overall quality factor I(t) will now be given in connection with FIG. 2.

In a general way, it is indicated that the abovementioned stage 2, according to FIG. 1*a,* consists in calculating an overall quality index I(t) on the basis of at least one frequency criterion and of a time-domain criterion of variation in energy and in envelope.

Figure 2:
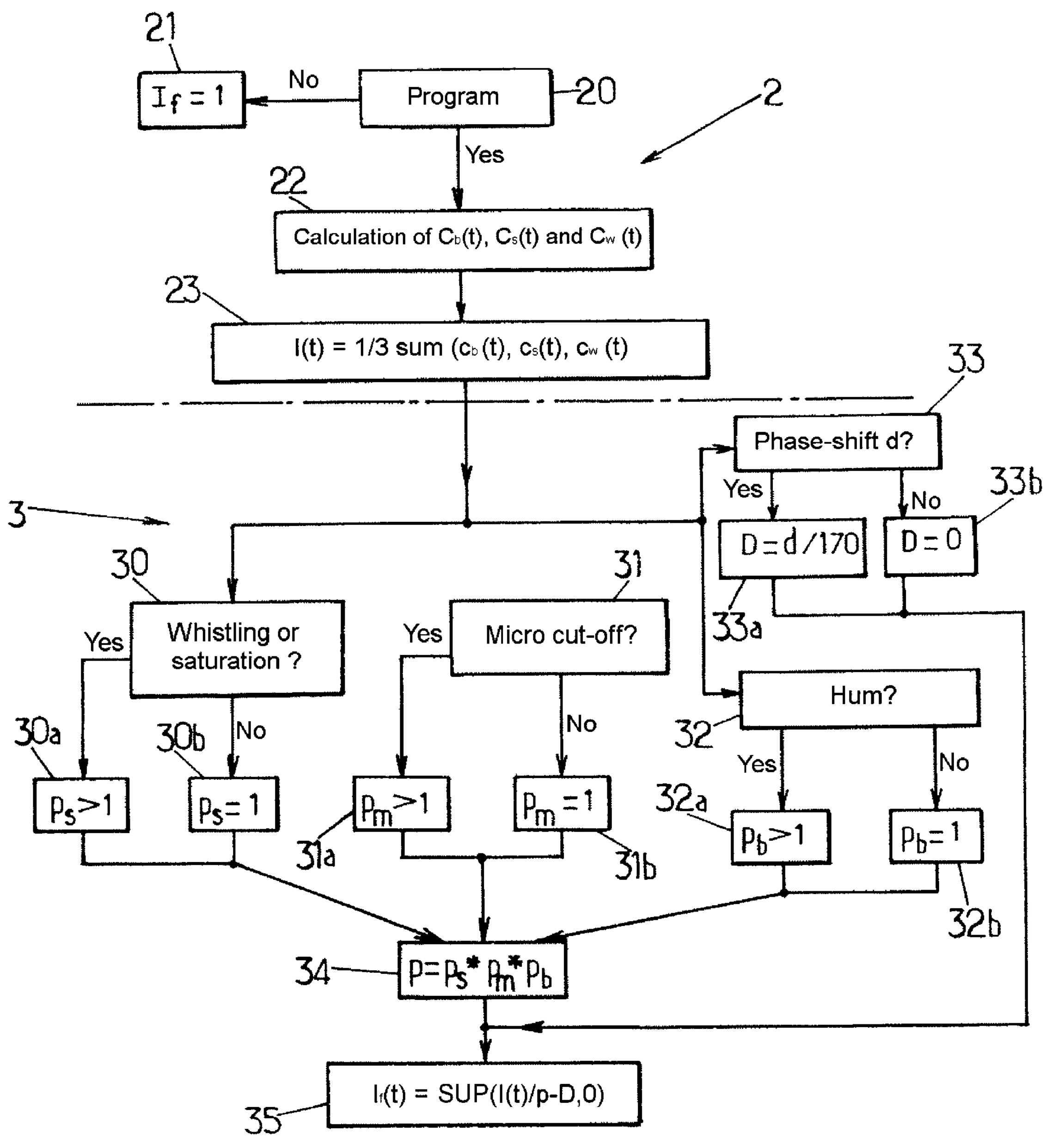
FIG. 2, in the form of a flow chart, represents a detail of a preferred implementation of the calculation stage on the basis of variations in energy and in envelope of the final quality index.

By reference to the abovementioned FIG. 2, stage 2 may comprise a stage 20 of detection of the existence of a radio or TV broadcast program in the digital signal. Upon a negative response to the abovementioned stage 20, an arbitrary value is allocated to the final-quality index If(t)=1, at stage 21, the quality in the absence of a program being deemed to be excellent. In contrast, upon a positive response at the abovementioned stage 20, the abovementioned stage 2 consists in taking into account the quality criteria relating to the variations in energy ΔW and in envelope ΔE, these criteria possibly consisting in the calculation of values such as values Cb(t) relating to the passband of the digital signal, values Cs(t) related to the stereo-phonic properties of the digital signal, and, finally, values Cw(t) based on the whitening of the time-domain signal.

The abovementioned stage 22 is then followed by a stage 23 consisting in calculating the value of the overall quality index, which is defined by a linear combination of the values Cb(t), Cs(t) and Cw (t).

By way of nonlimiting example, the overall quality index satisfies relationship (1):

$$I(t)=\tfrac{1}{3}[Cb(t)+Cs(t)+Cw(t)]$$

The value of the overall quality index thus obtained for a series of samples in question lies between 0, in the case of poor overall quality, and 1, in the case of excellent overall quality.

Following the abovementioned stage 2, the stage 3 of final-quality-index calculation can then be implemented, as represented in the preferred, nonlimiting embodiment of FIG. 2.

In a general way, stage 3 consists in weighting the value of the overall quality index I(t) as a function of the appearance of fault signals liable to disturb listening to the sound signals, these faults constituting alarms capable of prompting the operator to take measures in order to ensure the quality of the radio or TV broadcast.

In a general way, it is indicated that the fault signals of the alarms adopted are as follows:

whistling or saturation, the phenomenon of a microbreak, hum, inter-channel phase shift.

As regards the absence of a program, it is reiterated that this situation is governed by stage 20 of the stage 2 mentioned above in the description.

Hence, in FIG. 2, in a preferred, nonlimiting embodiment, stage 3 has been represented as consisting in detecting the existence, on the ADS digital signal, of at least one disturbance in transmission of the digital signal, this transmission disturbance being detected at stage 30 in the case of the existence of whistling or of saturation, at stage 31 in the case of the existence of a microbreak phenomenon, at stage 32 in the case of the existence of hum.

In addition to the detection of the existence of at least one disturbance in transmission of the digital signal at the abovementioned stages 30, 31 and 32, the method which is the subject of the present invention may consist, in order to implement stage 3, in detecting the presence of inter-channel phase shift at a stage 33, the presence of such a phase shift not being regarded as a transmission disturbance, however, because of relative phase shifts introduced, in certain cases, by the operators on the left-hand or right-hand channel respectively of the digital audio signals.

Following the detection of at least one disturbance in transmission of the digital signal at the abovementioned stages 30, 31 and 32, the method which is the subject of the present invention consists in assigning, to the existence of this disturbance, a specific weighting coefficient representative of the contribution of this disturbance to the degradation in the quality of the digital signals.

Thus, by reference to FIG. 2, in order to implement stage 3, it is indicated that, upon a positive response at stage 30 for detection of whistling or of saturation, a coefficient $p_s$, greater than 1, is allocated to the whistling or saturation phenomenon at stage 30*a*, whereas, upon a negative response at stage 30, a weighting coefficient $p_s=1$ is allocated at stage 30*b* to this same whistling or saturation phenomenon.

The same goes for the phenomenon of microbreak at stage 31 for which, upon a positive response, that is to say upon the existence of a microbreak, a weighting coefficient $p_m$, greater than 1, is allocated to the abovementioned phenomenon at stage 31*a,* whereas, upon a negative response in the absence of a microbreak, a weighting coefficient $p_m=1$ is assigned to this same phenomenon at stage 31*b*.

In the same way, in the case of the phenomenon of hum at stage 32, upon a positive response at the stage for detection of the abovementioned hum, a weighting coefficient $p_b$, greater than 1, is allocated to the hum and a weighting coefficient $p_b=1$ is allocated to the hum upon a positive response to the existence of this phenomenon at stage 32*b*.

Having regard to the value of the weighting coefficients $p_s$, $p_m$ and $p_b$ assigned to the whistling or saturation, microbreak or hum disturbance or alarm signals, an overall weighting coefficient, produced from the weighting coefficients assigned to each of the abovementioned disturbance signals, is calculated at stage 34, which satisfies relationship (2):

$$p=p_s \times p_m \times p_b$$

Thus, as represented moreover in FIG. 2, following the detection on the digital signal ADS of a phase shift of value d at stage 33, this phase shift corresponding to an inter-channel phase shift, the method which is the subject of the present invention consists in assigning a phase-shift criterion value D to this phase-shift value when this phase-shift value is greater than 0, that is to say upon a positive response to test 33, and a phase-shift criterion value D equal to 0 otherwise at stage 33*b,* that is to say upon a negative response to the test 33.

By way of nonlimiting example, it is indicated that, in the case of the existence of a phase shift detected at stage 33, the phase-shift criterion value may have the value D=d/170 and D=0 otherwise, the value of d being expressed in milliseconds, for example.

Stage 34 is then followed by a stage 35 consisting in calculating and determining the final quality index $I_f(t)$ by comparison of the difference between the weighted quality index, this weighted quality index taking the value of the overall quality index divided by the weighting coefficient p obtained at stage 34, and the value of the phase-shift criterion D attributed at stage 33*a* or 33*b,* this difference then being compared with the value 0.

Thus, in order to attribute the final quality index at stage 35, the latter, in the presence of a radio or TV broadcast program, satisfies relationship (3):

$$I_f(t)=\sup(I(t)/p-D,O).$$

Relationship (3) indicates that, to the final-quality index, there is attributed the larger value between the values consisting of the abovementioned difference and the value 0.

As regards the value of the weighting coefficients, tests have shown that:

- if whistling or saturation are detected: $p_s=1.75$ and $p_s=1$ otherwise;
- if a microbreak is detected: $p_m=1.5$ and p=1 otherwise;
- if hum is detected: $p_b=1.25$ and $p_b=1$ otherwise;
- if there is a phase shift of value d in ms, then D=d/170 and D=0 otherwise.

It is indicated that the relationship (3) formed at stage 35 is used, since by assumption the final quality index cannot have a negative value. A more detailed description of the processes of calculation of the values Cb(t) relating to the passband, Cs(t) relating to the stereophonic properties of the time-division digital signal, and Cw(t) relating to the whitening of the time-division digital signal, processes implemented at stage 22 represented in FIG. 2, will now be given in connection with FIGS. 3*a,* 3*b*, 3*c*.

Figure 3A:
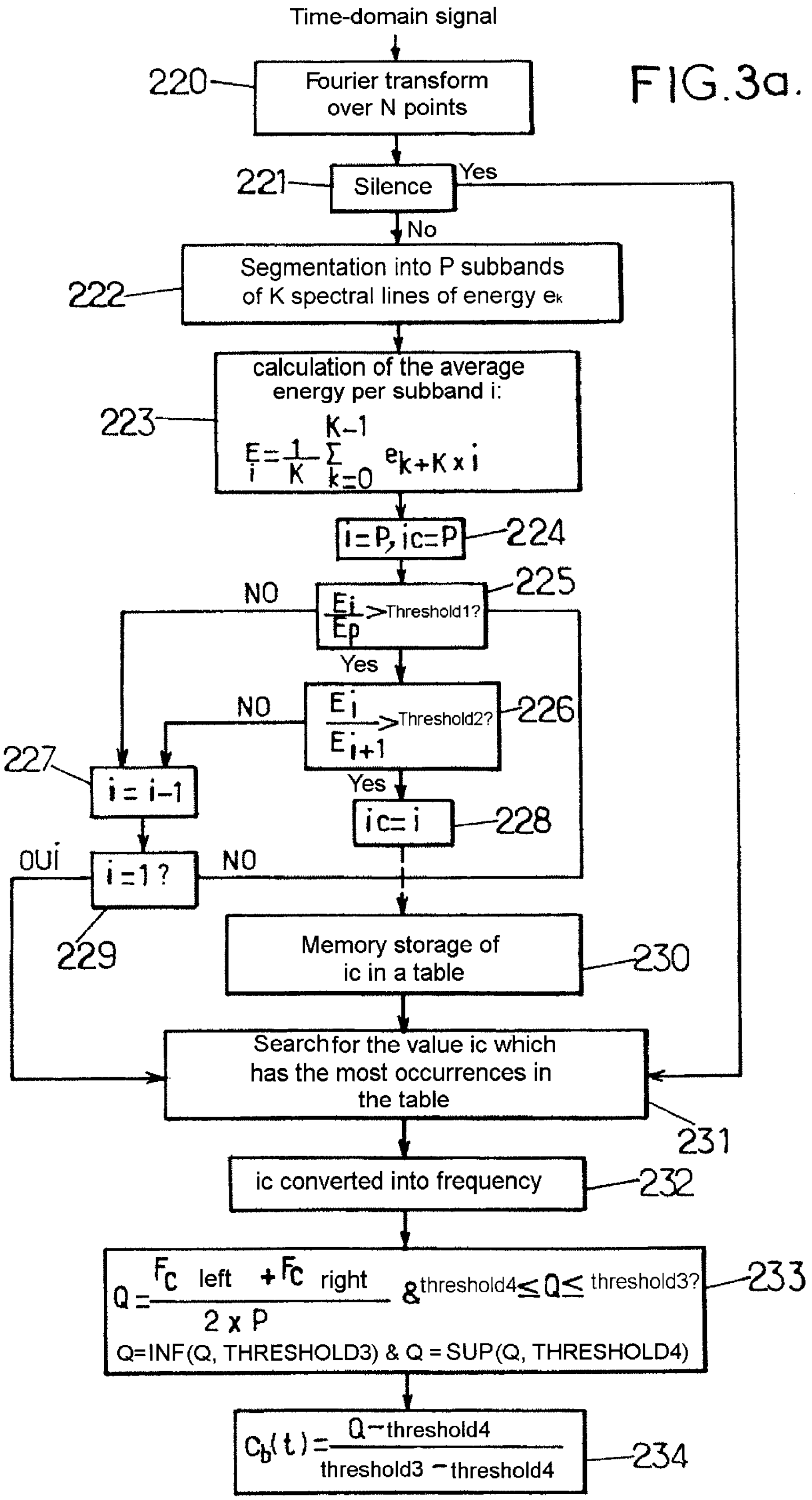
FIG. 3*a* represents a flow chart relating to a preferred, nonlimiting method of calculating a value Cb(t) relating to the passband of the digital signal, and allowing implementation of the preferred embodiment of the method which is the subject of the present invention represented in FIG. 2.

By reference to FIG. 3*a,* the stage of calculating the value Cb(t) related to the passband of the time-domain digital signal is implemented on the basis of a statistical analysis of the width of the passband of the digital audio signal.

In fact, in digital audio coding at low throughput, there exists a certain correlation between the throughput allocated and the width of the passband of the coded signal. In fact, the lower the allocated passband, the less good is the quality thereof.

A process making it possible strictly to detect the passband of the signal does not prove to be sufficient for estimating the perceived quality, since a signal the content of which has a narrow passband, coded or uncoded signal, risks being regarded wrongly as degraded. Having regard to the foregoing observation, it is therefore necessary to evaluate the critical frequency of this signal beyond which a coder can no longer carry out the coding process, and not the passband of the digital signal as such.

According to one particularly remarkable aspect of the method which is the subject of the present invention, this approach is made possible by observing that the spectrum of a coded signal generally possesses, as a characteriztic, a marked decrease in energy at the site of the cut-off at the abovementioned critical frequency. In parallel, the spectra of signals with a low content at high frequency are not in general characterized by such a break, but, in contrast, by a slow decrease in energy, which does not make it possible to discern a reference sequence of a coded sequence.

The method which is the subject of the invention, in particular the process of calculating the value Cb(t) relating to the passband of the digital signal, makes it possible to verify that the abovementioned break exists well before considering the estimate of the quality factor as being valid. Such a constraint considerably enhances the relevance of the method, which is the subject of the invention, in the context of the definition of an acceptability criterion relating to the coding defect.

In a general way, it is indicated that the method which is the subject of the present invention is valid only for signal regions containing information, that is to say outside regions of silence.

This is because the objective is to estimate, on average, the last frequency coded and not the instantaneous passband of the signal.

With this objective, the time-domain signal, as represented in FIG. 3*a,* is subjected to a frequency decomposition, time/frequency transformation, by discrete Fourier transform, for example, over N points of the digital signal weighted by a window, such as a Hamming window. The frequency decomposition is indicated at stage 220 of FIG. 3*a*. The power spectrum resulting from this transformation comprises $$\frac{N}{2}+1 \text{ points.}$$

The abovementioned stage 220 can then be followed advantageously by a stage 221 consisting in determining the existence of a region of silence. The test carried out at stage 221 may consist in comparing the energy of the spectrum obtained with a threshold value.

Upon a negative response at test 221, the latter is followed by a test 222 consisting in segmenting, into P subbands of K defined-energy spectral lines, the frequency decomposition of the time-domain digital signal obtained at stage 220. Each subband of the decomposition contains K spectral lines of energy $e_k$. The spectral lines and the subbands satisfy the relationship: K×P=N/2.

The abovementioned stage 222 is then followed, for the left-hand and right-hand channels transporting the digital signal ADS by a stage 223 of calculation of the average energy $E_i$ contained in each subband of ranking i.

The average energy contained in each subband of ranking i satisfies relationship (4):

$$E_i = \frac{1}{K}\sum_{k=0}^{K-1} e_{k+Ki}$$

In the preceding relationship, it is indicated that $e_{k+K \cdot i}$ designates the energy of each spectral line in question, making up the corresponding subband of ranking i.

The abovementioned stage 223 is then followed by a process consisting in determining the specific ranking $i_c$ of the corresponding subband of ranking i, for which the cut-off frequency, or abovementioned break, occurs, via at least one comparison of the ratio of the energy contained in the last subband taken as background-noise reference level with the energy contained in the other P-1 subbands with a first threshold value.

By way of nonlimiting example, for implementing the process for determining the specific ranking $i_c$ of the subband of ranking i for which the cut-off frequency occurs, this process can be implemented on the basis of a stage 224 consisting in reading the value of the ranking i of the subband in question, an arbitrary value i=P, and in checking whether the subband of corresponding ranking corresponds to the cut-off-frequency subband, and, in a test stage 225, in comparing the energy level contained in the corresponding subband of ranking i, energy level denoted $E_i$, to that, denoted $E_p$, contained in the other P-1 subbands with a threshold value denoted Threshold1. The comparison operation is expressed:

$$\frac{E_i}{E_P} > \text{Threshold 1?}$$

Upon a negative response to test 225, the ranking of the subband i is decremented to the value i−1 at stage 227. The value of the subband i index is then subjected, at stage 229, to a comparison with the value 1 making it possible to verify whether all the subbands have been taken into consideration.

Upon a negative response at test 229, the process is repeated, the energy of the subband of corresponding ranking i, other than 1, being again subjected to test 225.

According to a first implementation of the process represented in FIG. 2*a*, it is indicated that stage 225 can then be followed, upon a positive response to the test at the abovementioned stage 225, by a stage 228 consisting in storing in memory the ranking $i_c$=i of the frequency subband for which the cut-off frequency is detected. This memory storage takes place, in a particularly advantageous way, in a table of ranking values at a stage denoted 230.

The abovementioned stage 230 is then followed by a stage 231 consisting in searching, in the table of memory-stored values, via a sort program, for the value of the ranking $i_c$ with the largest occurrence.

Stage 231 is then followed by a stage 232 making it possible in effect to determine the most probable cut-off frequency $F_c$ for the right-hand and left-hand channels. It will be understood, in particular, that the determining of the most probable cut-off frequency $F_c$, $F_c$left, $F_c$right, is carried out by conversion of the ranking $i_c$ into the value of the corresponding frequency subband.

The abovementioned stage is then followed by a stage 233 consisting in calculating the average value Q of the left-hand and right-hand cut-off frequencies, which is normalized by the maximum theoretical cut-off frequency P, the abovementioned average value Q satisfying relationship (5):

$$Q = \frac{F_c \text{ left} + F_c \text{ right}}{2P}$$

In the same stage 233, the average value of the frequencies Q can then be subjected to a normalization on a psycho-acoustic criterion defined by at least one threshold value for good digitalaudio coding quality, denoted Threshold3, and a threshold value for poor digitalaudio coding quality, denoted Threshold4.

At the abovementioned stage 233, the average value Q can then be compared to discover whether it is greater than the value Threshold4 and less than the value Threshold3 according to the relationship:

$$\text{Threshold}\mathbf{4} \leq Q \leq \text{Threshold}\mathbf{3}?.$$

By way of nonlimiting example, it is indicated that a cut-off frequency of the order of 17 kHz implies good digitalaudio coding quality, whereas a cut-off frequency of the order of 10 kHz implies coding with an enormous amount of degradation. The values for Threshold4 and Threshold3 may, for example, correspond to frequencies of 10 kHz and 17 kHz respectively. The abovementioned stage 233 may then be followed by a stage 234 consisting in fact in calculating a reduced value constituting the value Cb(t) relating to the passband, passband, the abovementioned value satisfying relationship (6):

$$Cb(t) = \frac{Q - \text{Threshold4}}{\text{Threshold3} - \text{Threshold4}}.$$

The reduced value is thus obtained by a translation and a scaling in order to obtain the value Cb(t) relating to the passband, and the value of which lies between 0 and 1.

As has been represented, moreover, in FIG. 3*a,* and particularly advantageously, the method of calculating the value relating to the passband may further include, in a second embodiment, a supplementary stage making it possible to ensure that the cut-off detected actually corresponds to a break at the level of the spectral energy. This supplementary stage consists in a second condition introduced at stage 226, inserted between the abovementioned stages 225 and 228.

Hence, in addition to the first comparison of stage 225, the method and process of calculation represented in FIG. 3*a*, upon a positive response to the first comparison of stage 225, include a second stage of comparison of the ratio $E_i/E_{i+1}$ of the energy of the subband of ranking i to the energy of the subband of subsequent ranking i+1 with a second threshold value, designated by Threshold2.

Hence, the following stage of memory-storage of the ranking $i_c=i$, referenced 228, memory storage of the frequency subband for which the cut-off frequency is detected, is then conditioned by the positive response to the first and to the last comparison carried out at stage 225 and 226. The negative response to the first and second comparison test 225, 226 is followed, if i≠1, by a return to the first comparison test and by a call for the search stage of ranking $i_c$ with the highest occurrence, at stage 231.

Following the series of trials carried out, it is indicated that, for N, the number of points of the frequency decomposition equal to 2048, the number N possibly, however, lying within a range of values lying between [256, 4096], the process of calculating the value Cb(t) relating to the passband is optimum for the following values:

*P*=32 ([2; *N*/2])

K =32 ([1; *N*/4])

Threshold1=100 ([10; 1000])

Threshold2=17 ([5; 50])

Threshold3=0.7 ([0.51; 1])

Threshold4=0.4 ([0; 0.49]).

In the abovementioned numerical values, it is indicated that the values between brackets and square brackets indicate ranges of possible values which are likely to be suitable for the various parameters specified.

A more detailed description of a process for calculating the value Cs(t) relating to the stereophonic properties of the time-domain digital signal will now be given in connection with FIG. 3*b*.

The process of calculating the abovementioned value Cs(t) is based on the principle according to which the left-hand and right-hand channels transporting the sound signals are coded independently. This means that the coding errors are decorrelated between the two channels, while the sound content of the two channels remains, without exception, relatively similar. The calculating process employed therefore rests on the fact that the residual signal which is the difference in the energies of the left-hand and right-hand channels is proportional to the coding error if coding has taken place.

The benefit of such an approach lies in the change from an analysis without reference to a pseudo-differential analysis in which the error signal is deduced by comparison of the digital signals transported by the two channels.

However, such a process does not make it possible to evaluate the quality of the coding for a strongly stereophonic signal or, in contrast, a strictly monophonic signal.

Figure 3B:
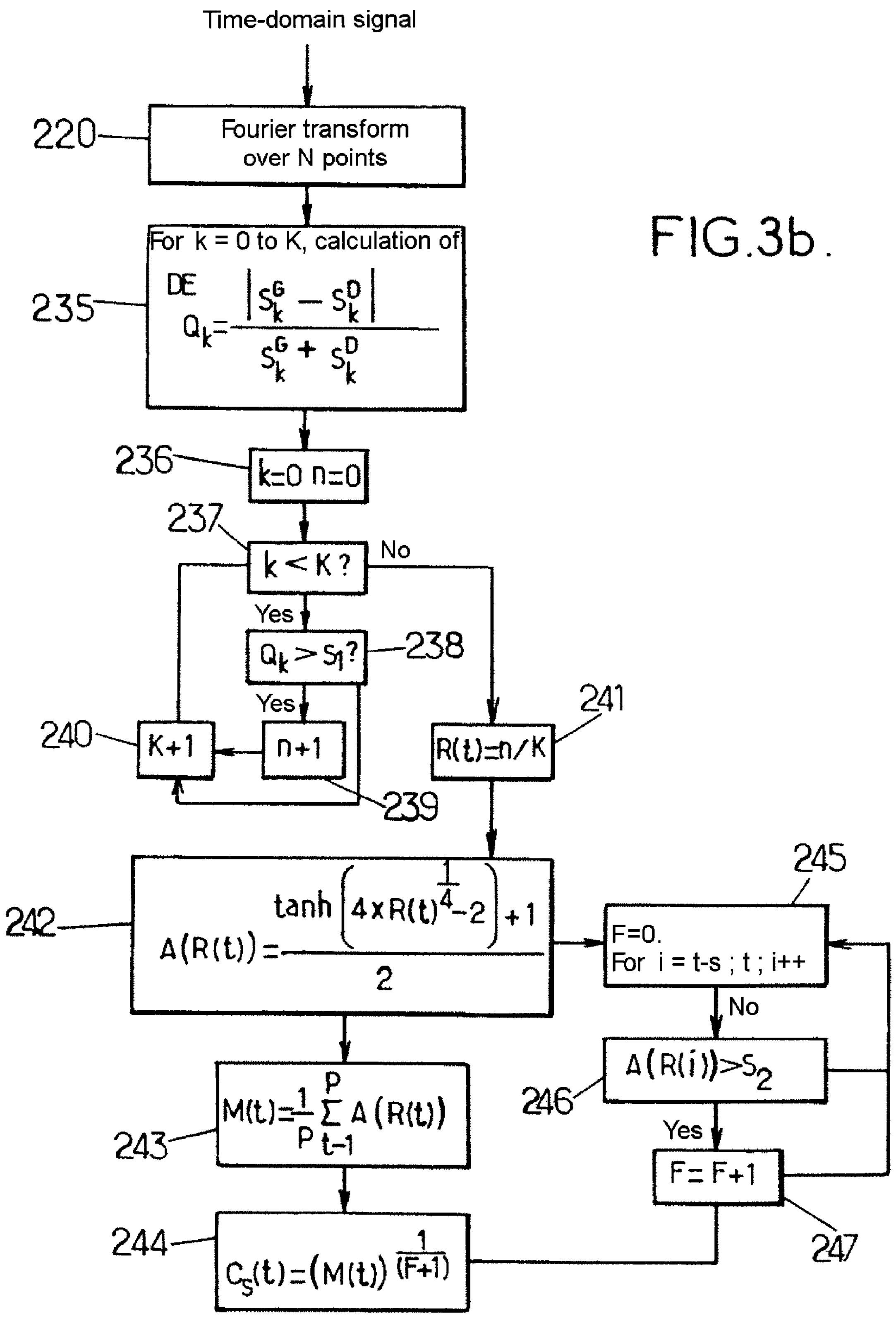
FIG. 3*b* represents a flow chart relating to a preferred, nonlimiting, method of calculating a value Cs(t) relating to the stereophonic properties of the time-domain digital signal and allowing implementation of the preferred embodiment of the method which is the subject of the present invention represented in FIG. 2.

For this reason, the calculating process represented in FIG. 3*b* relating to the calculation of the value Cs(t) linked to the stereophonic properties of the time-domain digital signal is based on the energy spectrum of the digital signal obtained after frequency decomposition by a Fourier transform over N points of the time-domain signal, weighed by a Hamming window, for example. The frequency spectrum thus obtained comprises N/2+1 spectral lines.

As a consequence, the time-domain signal, as represented in FIG. 3*b*, is subjected to the Fourier transform over N points at stage 220 as described above in connection with FIG. 3*a*.

The abovementioned stage 220 is then followed by a stage 235 consisting, for each spectral line of ranking k obtained following the frequency decomposition, in calculating a factor $Q_k$ representative of the stereophonic quality of the signal from reference spectra $S_k^G$ of the left-hand channel and $S_k^D$ of the right-hand channel. The factor $Q_k$ in fact constitutes a standardized difference in the energies of the right-hand and left-hand channels satisfying relationship (7):

$$Q_k = \frac{|S_k^G - S_k^D|}{S_k^G + S_k^D}.$$

More specifically, it is indicated that the value $Q_k=0$ corresponds to a spectral line of ranking k and a strictly monophonic frequency, whereas the value $Q_k=1$ corresponds to a spectral line of ranking k and to a heavily stereophonic frequency.

The process of calculating the value Cs(t) linked to the stereophonic properties of the digital signal then consists in determining the percentage R(t) of the spectral lines belonging to a given frequency band Δf for which the factor $Q_k$ exceeds a defined threshold value, denoted $S_1$, the percentage R(t) satisfying the relation:

$$R(t)=n/K$$

where n designates the number of times when the factor $Q_k$ representative of the stereophonic quality of the signal is higher than a threshold value $S_1$ for every value of K belonging to Δf, the abovementioned frequency band.

By way of nonlimiting example, in order to determine the percentage R(t), as represented in FIG. 3*b*, this process may consist, at a stage 236, following the abovementioned stage 235, in initializing the value of k, index of spectral lines of frequencies, at the value 0, and the value of n at the value 0. Stage 236 is followed by a stage 237 consisting in comparing the value of the current index of spectral lines k with the value K, the number of spectral lines arising from the spectral decomposition. Upon a negative response to test 237, this test is followed by a stage 241 consisting in assigning, to the value of the percentage R(t), the value n/K for the value of n. In contrast, upon a positive response to test 237, this test is followed by a test 238 consisting in comparing the value of the factor $Q_k$ representative of the stereophonic quality of the signal with the threshold value $S_1$ mentioned above in the description. The comparison is expressed $Q_k>S_1$ ?.

Upon a negative response to the abovementioned comparison test 238, the value of k designating the ranking of the spectral line is incremented by one unit at stage 240 and the calculating process is brought back to stage 237 for verification by comparison that ranking k is less than the value K. In contrast, upon a positive response to test 238, this test is followed by a stage 239 of implementation of the value n by one unit, this implementation stage 239 itself being followed by the stage 240 of implementation of the index k of the spectral line in question.

The stage 241 is then followed by a stage 242 consisting in correcting the value of the percentage R(t) by a specific function A such that the value of this function of the percentage R(t) lies between 0 and 1. The function A, of the form A(R(t)), is an increasing monotonic function of the value of the percentage R(t). By way of nonlimiting example, the function A(R(t)) may satisfy the relation:

$$A(R(t)) = \frac{\tanh\left(4 \times R(t)^{\frac{1}{4}} - 2\right) + 1}{2}$$

The stage 242 makes it possible to generate a percentage value M(t), the average of a defined number P of corrected percentage values satisfying relation (8):

$$M(t) = \frac{1}{P}\sum_{t=1}^{P} A(R(t)).$$

The process of calculating the value Cs(t) linked to the stereophonic properties of the time-domain digital signal also includes a stage consisting, in a time-domain window of defined duration, a time-domain window of s seconds, in determining the number of times F when an alarm-threshold value $S_2$ has been crossed by the corrected-percentage value A(R(t)). The stage may consist, in a stage 245, of definition of the window and of initialization of the number of times F at the value 0, followed by a stage 246 of comparison as to whether the value of the function A(R(t)) is greater than the value $S_2$ constituting an alarm threshold. The comparison relation is expressed:

$$A(Ri))>S_2?$$

i designating successive instants during the window of duration s. The stage 246 is followed by a stage 247 consisting, upon a positive response to test 246, in implementing the value of the number of times F by one unit at stage 247, the negative response to the test 246 leading back to stage 245 in order to move on to the following instant belonging to the window of duration s seconds. The stages 243 and 247 are then followed by a stage 244 consisting in calculating the value Cs(t) linked to the stereophonic properties of the time-domain digital signal on the basis of a function of the average value M(t) given at relation (8), this function satisfying relation (9):

$$Cs(t) = (M(t))^{\frac{1}{(F+1)}}.$$

Finally, at an instant t, the value Cs(t) of stereophonic acceptability is given by the abovementioned relation (9).

In one example implementation of the calculating process represented in FIG. 3*b*, it is indicated that, for N=2048, N possibly lying between [256; 4096], then, the method is optimum for the values below:

$\Delta f$=[0; 14.4 kHz] or K, number of spectral lines obtained=614;

$S_1$=0.99 ([0.51; 1])

$s$=1 second ([0.1; 100])

$P$=100 ([1; 1000])

$S_2$=0.75 ([0.01; 1]).

In the abovementioned numerical values, it is indicated that the values between brackets and square brackets designate ranges of values liable to be used.

A more detailed description of the process of calculating the value Cw(t) linked to the whitening of the digital signal will now be given in connection with FIG. 3*c*.

The introduction of the whitening of the digital signal makes it possible to perform a comparison of the digital signal before and after whitening. The process of whitening is carried out by means of a whitening filter. The properties of such a filter are as follows: For a vector X consisting of the Ne time-domain input samples of the signal and for the vector Y consisting of the Ne time-domain output samples of the whitening filter, W designates the matrix containing the coefficients of the abovementioned whitening filter.

The expression for the output vector from the input vector is obtained by the relation:

$$Y=W^H X,$$

the symbol H indicating the operations of transposition and of conjugation.

For a coded digital signal of quality, the digital signal subjected to the whitening obtained after passing through the whitening filter corresponds substantially to white noise, the covariance matrix $R_{yy}$ of which satisfies the relation:

$$R_{YY}=\sigma_Y^2 \cdot I$$

where $\sigma_Y^2$ designates the power of this white noise and I the identity matrix.

However, $R_{YY}$ is the average value of the matrix $YY^H$, denoted $<YY^H>$.

The matrix W containing the coefficients of the filter being regarded as constant throughout the duration of calculation of the abovementioned average value, there is then obtained:

$$R_{YY}=[W^H XX^H W]=W^H[XX^H]W=W^H R_{XX} W=\sigma_Y^2 \cdot I \quad \text{Relation (10)}$$

In the foregoing relation, $R_{XX}$ designates the covariance matrix of the input time-domain signal. This matrix satisfies relation (11):

$$WW^H = \frac{1}{\sigma_Y^2} R_{XX}^{-1}.$$

Given that the matrix W possesses hermitian symmetry, of the form $W^H=W$, the abovementioned relation (11) is expressed according to relation (12):

$$WW = \frac{1}{\sigma_Y^2} R_{XX}^{-1}$$

Experimental results have shown that an approximation of the type $W=R_{XX}^{-1}$ then provided good results while very substantially simplifying the calculations.

Overall, the process of calculating the value Cw(t) linked to the whitening of the digital signal, is carried out in the following way:

- calculation of the covariance matrix $R_{XX}$ of the digital signal received;
- anti-aliasing low-pass filtering and division by a factor of 2 of these signals;
- filtering of the divided signal by the inverse covariance matrix of the initial signal.

The filtering process thus employed corresponds to an empirical filtering for which no theoretical justification can be established for the time being. This process is implemented validly only for the regions of received digital signal containing information, that is to say outside the regions of silence.

To that end, following a stage of detection of a region of silence 221, as described previously and in the description, the calculation process proper is implemented upon a negative response at the abovementioned stage 221. The process is implemented for the left-hand channel, or the right-hand channel, respectively.

For each of the abovementioned channels, the process then consists in calculating the covariance matrix Rg, Rd of the input signal and of a random signal lying between the values −1 and +1 at stages 250*g*, 250*d*. This operation can be carried out, as represented illustratively in FIG. 3*c*, by addition, to the input digital signal of the left-hand channel, respectively of the right-hand channel, of a random signal generated at a stage 248, this random signal being a signal with a value lying between −1 and +1. This way of working makes it possible to obtain a covariance matrix which can always be inverted.

On the basis of the samples obtained following the implementation of stages 249*g* and 249*d*, the calculation proper of the covariance matrix Rg and Rd at stages 250*g* and 250*d* can be achieved on the basis of the signal X, the series of samples obtained by implementing stages 249*g* and 249*d* respectively. The matrix X comprises $2\times N^2$ samples, and the calculation of the covariance matrix Rg, Rd designated under the form $R_{XX}$ is given by relation (13):

$$R_{XX}=\frac{1}{2N}XX^H\frac{1}{2N}XX^T.$$

The elements of the covariance matrices Rg and Rd are real.

Stages 250*g* and 250*d* are then followed by stages of calculation of the inverse covariance matrices 251*g* and 251*d* respectively.

The abovementioned stages can then be followed by stages of anti-aliasing low-pass filtering 252*g*, 252*d* applied to the input digital signal on the left-hand and right-hand channels respectively. The stages 252*g* and 252*d* are then followed by a stage 253*g*, 253*d* of division by a factor 2 in order to generate a left-hand and right-hand input matrix Eg, Ed respectively. These operations are referenced at stages 254*g* and 254*d* respectively. The matrices Eg and Ed, input matrices, are obtained by storing, in the corresponding matrices, the coefficients obtained following the abovementioned division operation 253*g*, 253*d*.

Following the creation of the input matrices Eg and Ed, the filtering stages make it possible to generate an output matrix Sg at operation 255*g* and an output matrix Sd at operation 255*d* is then carried out on the basis of the left-hand and right-hand input matrices, Eg, Ed respectively.

The output signal for the left-hand channel, and the right-hand channel respectively, is then obtained by the operation satisfying relation (14):

$$S=R_{XX}^{-1}E.$$

In the preceding relation, S, R and E should be understood as designating Sg, Sd; Rg, Rd and Eg, Ed respectively.

Figure 3C:
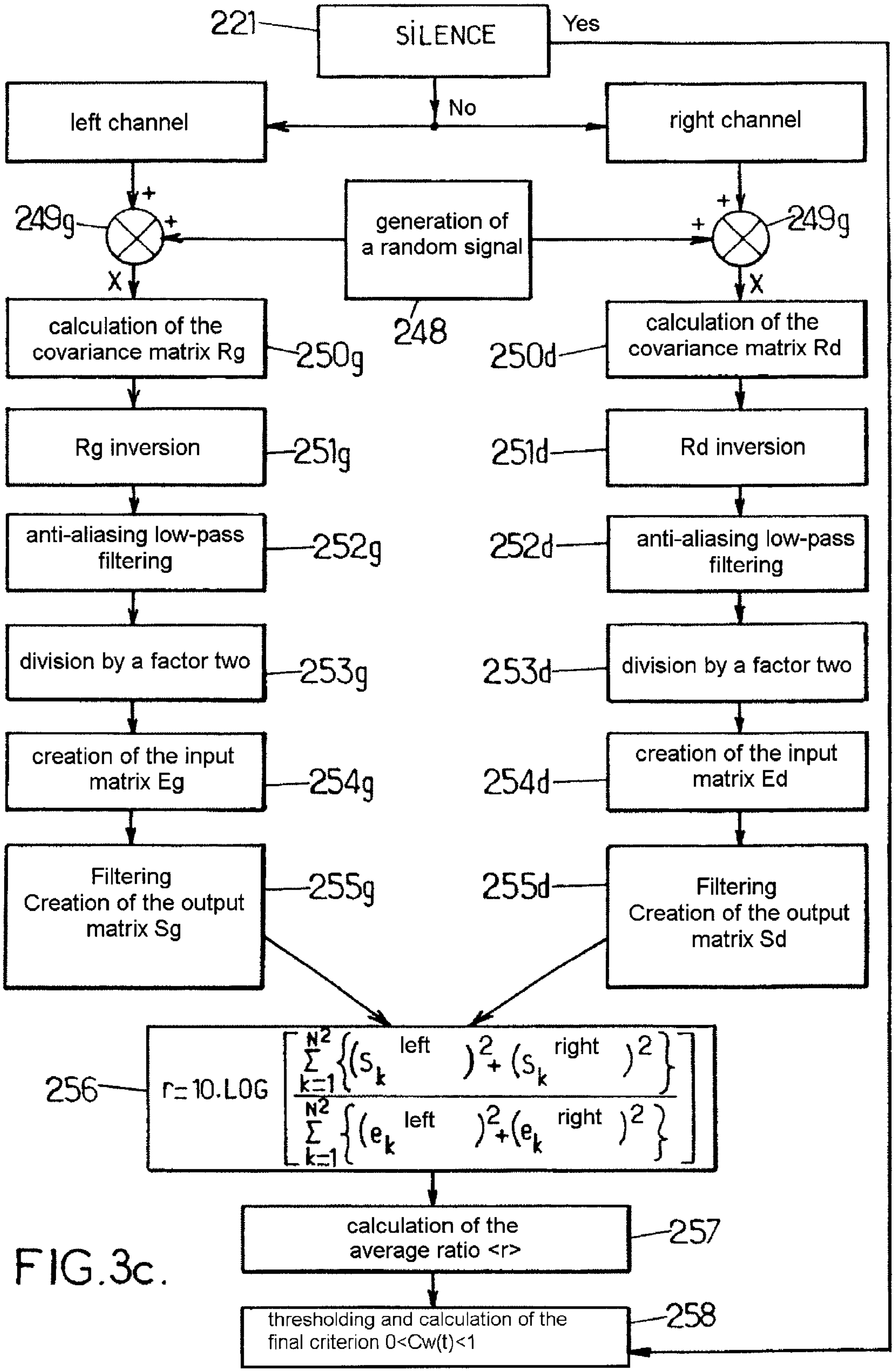
FIG. 3*c* represents a flow chart relating to a preferred, nonlimiting method of calculating a value Cw(t) relating to the whitening of the time-domain digital signal for each channel of the time-domain digital signal and allowing implementation of the method which is the subject of the present invention represented in FIG. 2.

With reference to FIG. 3*c*, it is indicated that the calculating process then consists, following stages 255*g* and 255*d*, in calculating, at stage 256, from the abovementioned left-hand and right-hand input and output matrices, a ratio between the energy of the output signal and the energy of the input signal. This ratio, designated by r, satisfies relation (15):

$$r=10.\log\left[\frac{\sum_{k=1}^{N^2}\left\{(S_k^g)^2+(S_k^d)^2\right\}}{\sum_{k=1}^{N^2}\left\{(e_k^g)^2+(e_k^d)^2\right\}}\right].$$

The preceding relation expresses the ratio in dB between the energy of the output signal and the energy of the input signal, $(S_k^g)^2$, $(S_k^d)^2$ designating the energy of the output signal on the left-hand and right-hand channels respectively, and $(e_k^g)^2$ and $(e_k^d)^2$ designating the energy of the input signal after division on the left-hand channel and right-hand channel respectively, N designating the number of rows of the matrices processed, related to the number of samples by the relation $Ne=2\times N\times N$.

Operation 256 is then followed by an operation 257 consisting, from the last L ratio values, an average ratio <r> between the energy of the output signal and the energy of the input signal, this average ratio satisfying relation (16):

$$\langle r\rangle=\frac{1}{L}\sum_{k=1}^{L}10.\log\left[\frac{E_s^g+E_s^d}{E_e^g+E_e^d}\right]$$

this average ratio being calculated in a sliding window containing the last L results.

$$E_e^g=\sum_{k=1}^{N^2}e_k^2\ \text{(left)}\quad E_e^d=\sum_{k=1}^{N^2}e_k^2\ \text{(right)}$$

designate the energy of the input signal on the left-hand and right-hand channel, and $$E_s^g=\sum_{k=1}^{N^2}S_k^2\ \text{(left)}\quad E_s^d=\sum_{k=1}^{N^2}S_k^2\ \text{(right)}$$

designate the energy of the output signal on the left-hand and right-hand channel.

Stage 257 is then followed by a stage consisting in submitting the value of this average ratio <r> to a comparison as to whether it is greater than a first threshold value $S'_1$ and less than a second threshold value $S'_2$. Upon the abovementioned comparison criterion being satisfied, a stage of calculating the value Cw(t) linked to the whitening of the input digital signal is carried out, this value being defined as the ratio, increased by one unit, of the difference between the average ratio <r> and of the second threshold value $S'_2$ to the difference between the second $S'_2$ and the first threshold value $S'_1$.

The value Cw(t) linked to the whitening of the input digital signal then satisfies relation (17):

$$Cw(t)=1+\frac{\langle r\rangle-S'_2}{S'_2-S'_1}.$$

In FIG. 3*c* has been represented the stages consisting in submitting the value of the average ratio <r> to a comparison as to whether it is higher than the first and the second threshold value $S'_1$ and $S'_2$, and of calculation of the value Cw(t) linked to the whitening in one and the same stage 258 by reason of the fact that the calculation of the value Cw(t)

is conditioned by the success of the double comparison of the value of the average ratio to the abovementioned threshold value $S'_1$ and $S'_2$.

Thus a value Cw(t) is obtained, linked to the whitening of the input signal, lying between the value 0 and 1.

In contrast, in the presence of a region of silence upon a positive response to the test 221, the average ratio is not updated and the value Cw(t) linked to the whitening of the input digital signal keeps the value at the preceding instant t−1. The value at the preceding instant is therefore used as a value at the current instant.

Experimental results have made it possible to show that, for N=16, the input matrix contains 512 samples and the method is an optimum for the following values of the anti-aliasing low-pass filter used to carry out the operations at stages 252*g* and 252*d*. These values are given in the table below, for an anti-aliasing filter comprising K=43 coefficients.

| | | | | | | | |
|---|---|---|---|---|---|---|---|
| 0.0006 | −0.0017 | −0.0022 | 0.0010 | 0.0106 | 0.0253 | 0.0376 | 0.0372 |
| 0.0193 | −0.0082 | −0.0268 | −0.0203 | 0.0087 | 0.0358 | 0.0323 | −0.0086 |
| −0.0572 | −0.0626 | 0.0089 | 0.1413 | 0.2707 | 0.3244 | 0.2707 | 0.1413 |
| 0.0089 | −0.0626 | −0.0572 | −0.0086 | 0.0323 | 0.0358 | 0.0087 | −0.0203 |
| −0.0268 | −0.0082 | 0.0193 | 0.0372 | 0.0376 | 0.0253 | 0.0106 | 0.0010 |
| −0.0022 | −0.0017 | −0.0006 | | | | | |

The sliding window containing the last L results is L=100, the value L, however, possibly lying between ([10; 1000]).

The threshold value $S'_1$ is equal to −60 dB and $S'_2$=−20 dB.

A more detailed description of the operations of detection of microbreak, whistling or saturation, of hum and of the existence of a phase shift between channels implemented at stage 3 by the stages 31, 30, 32 and 33 of FIG. 2 will now be described in connection with FIGS. 4*a*, 4*b*, 5*a*, 5*b*, 6*a*, 6*b* and 7.

As regards the stage 31 for detection of a microbreak, also designated as brief cut-off, it is indicated that it can advantageously consist in detecting, on a series of successive samples of the digital signal ADS, a rapid decrease in the energy level of this digital audio signal towards a zero energy revealing an absence of reverberation of the abovementioned audiodigital signal.

Figure 4A:
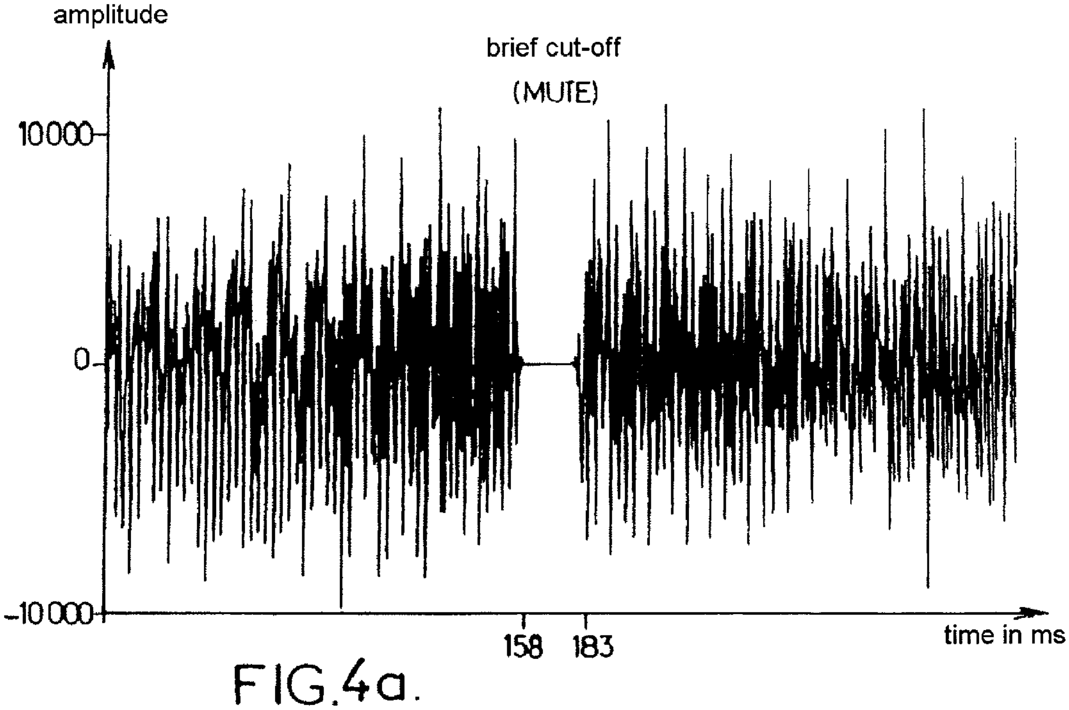
FIGS. 4*a* and 4*b* represent a process of detection of a brief cut-off signal.

In FIG. 4*a*, the x-axis is graduated in milliseconds and the y-axis in amplitude, the brief cut-off, also designated by the name of mute, being represented as the rapid decrease of the energy level of the digital audio signal towards a zero energy.

Figure 4B:
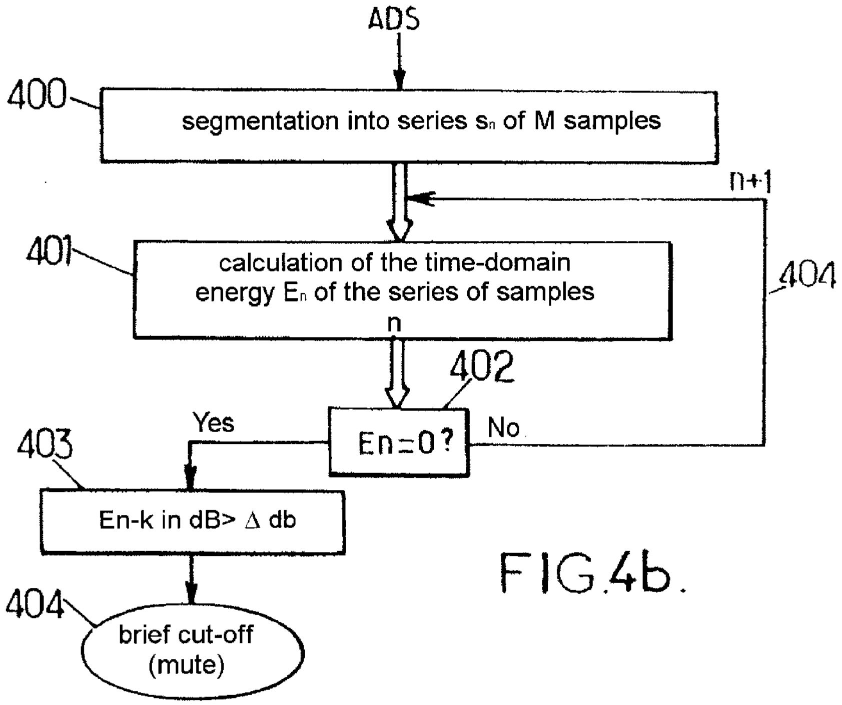

With reference to FIG. 4*b*, it is indicated, in a nonlimiting way, that the stage of detection of a parasitic signal such as a brief cut-off may comprise a stage 401 consisting in determining, separately on each stereophonic channel, for a plurality of series of M successive samples, the average energy $E_n$ of the signal transported by this channel, n designating the ranking of each series of samples $S_n$. The stage 401 is followed by a stage consisting in comparing the evolution of the average energy for the series of M successive samples. The abovementioned stage can be carried out by comparison of the average energy $E_n$ of the signal transported with the value 0 at stage 402, then a comparison 403 of one or more of the abovementioned average energies to a threshold value Δ dB. Thus, the existence of a parasitic brief-cut-off signal is revealed if at least one of the average energies is zero and if one or more average energies adjacent to this zero average energy is greater than a given threshold value, the value Δ.

As regards the stage 30 of detection of whistling or of saturation, it is indicated that this stage will be described in the case of the detection of a whistling, saturation being most often accompanied by a whistling.

Figure 5A:
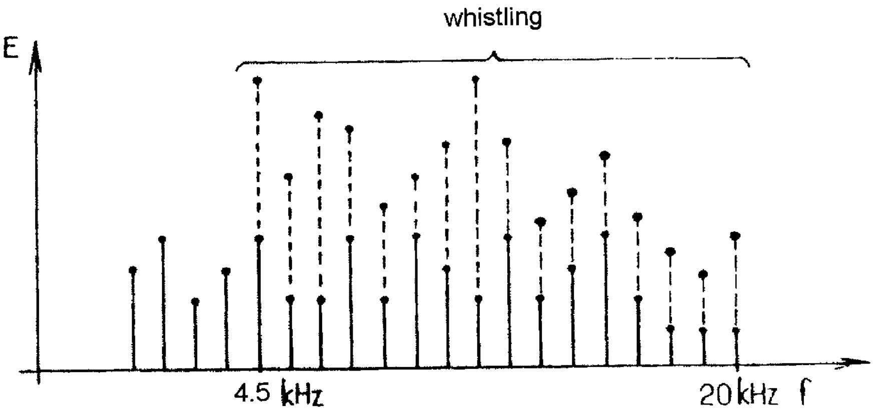
FIGS. 5*a* and 5*b* represent a process for detecting a parasitic whistle signal.

By reference to FIG. 5*a*, it is indicated that the detection of a parasitic signal such as a whistling in the ADS digital audio signal may consist advantageously. in detecting, in this signal, a sudden and transient increase in the spectral energy of the latter in a band of frequencies, the low frequency of which lies between 4.5 kHz and 6.5 kHz and the high frequency of which may reach up to 20 kHz.

In FIG. 5*a*, the x-axis is graduated in frequency and the y-axis in corresponding energies for the frequency bands considered.

Figure 5B:
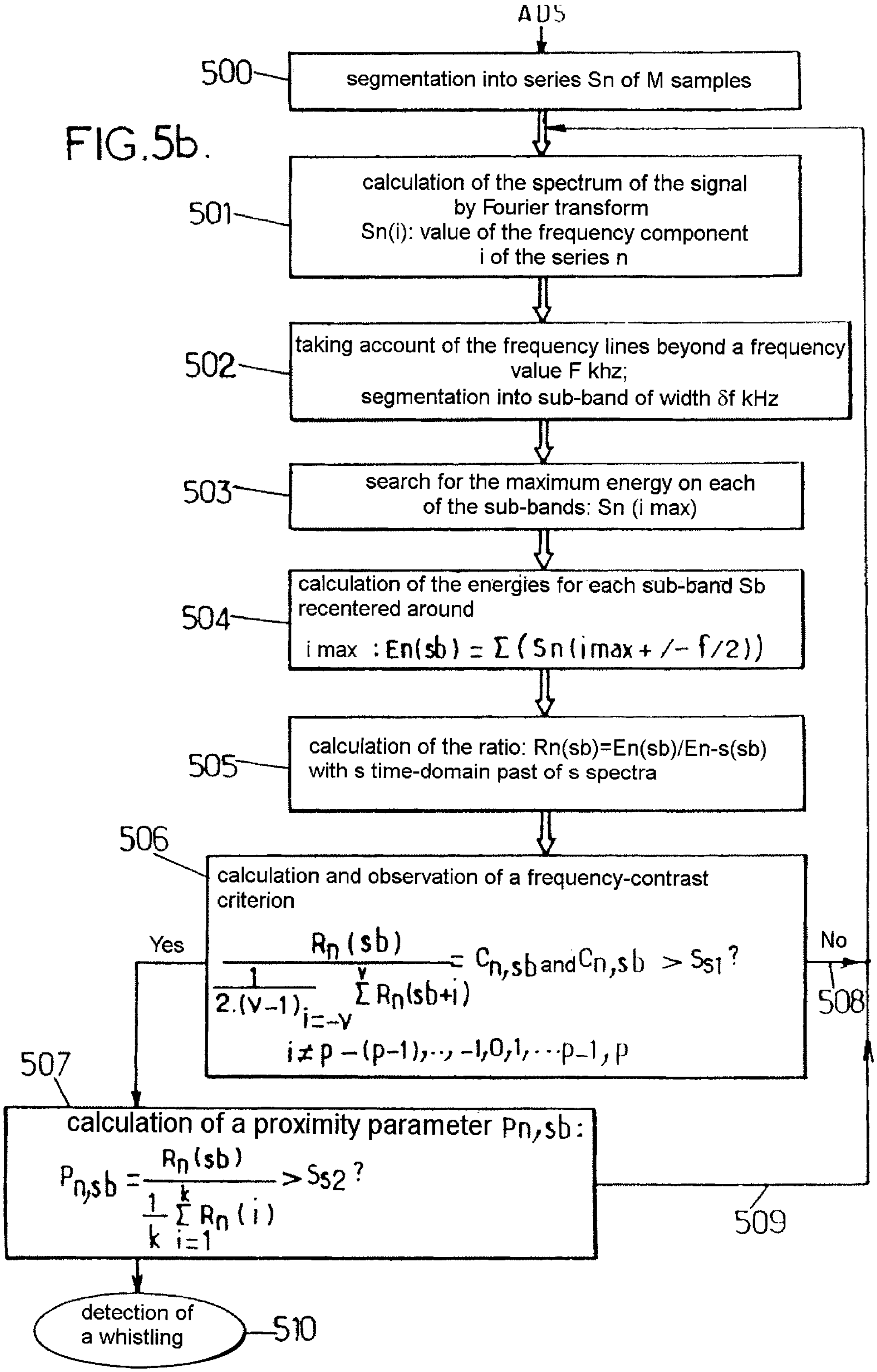

With reference to FIG. 5*b*, it is indicated that the process of detection of a parasitic signal such as a whistling may comprise a stage 501, 502 consisting in calculating, on a series of samples of the digital audio signal ADS, the spectral composition of this signal defined as the value $S_n(i)$ of frequency components in subbands with central frequency $f_i$ and with bandwidth Δf, n designating the ranking of the series of samples. The stages 501 and 502 are then followed by a stage 503, 504 consisting in calculating the average value of the energy $E_n(sb)$ of a range of the abovementioned subbands for the series of samples of ranking n in question.

A stage 506 of calculating an auditory contrast value is then carried out, $C_{n,sb}$ on the basis of the value of the ratio:

$$R_n(sb) = \frac{E_n(sb)}{E_{n-S}(sb)}$$

This ratio calculated at stage 505 designates the ratio between the energy $E_n(sb)$ of this range for the current series and for a plurality of preceding series $E_{n-s}(sb)$ of samples. The auditory contrast value satisfies relation (18):

$$C_{n,sb} = \frac{R_{n(sb)}}{\frac{1}{2\cdot(v-1)} \sum_{\substack{i=-v \\ i\neq p(p-1),0,p-1,p}}^{v} R_{n(sb+i)}}$$

In this relation, $R_n(sb+i)$ designates, for i=−ν, the value of the ratio for the adjacent subbands of the same series of samples of ranking n and of the same spectrum $S_n$.

Furthermore, at stage 506, a comparison of the auditory-contrast value $C_{n,sb}$ with a first whistling threshold value, denoted $S_{s1}$, is carried out, the comparison being denoted $C_{n,sb}>S_{s1}$.

The abovementioned stage 506 is followed by a stage 507 of calculating a proximity parameter, denoted $P_{n,sb}$, satisfying relation (19):

$$P_{n,sb} = \frac{R_{n(sb)}}{\frac{1}{k}\sum_{i=1}^{k} R_{n(i)}}$$

Moreover, at stage 507, a comparison of the proximity parameter $P_{n,sb}$ with a second whistling value $S_{s2}$ is carried out, the comparison being denoted $P_{n,sb}>S_{s2}$. The presence of a parasitic whistling signal is revealed if the comparisons of being greater of the auditory-contrast value and the proximity parameter are both satisfied.

Figure 6A:
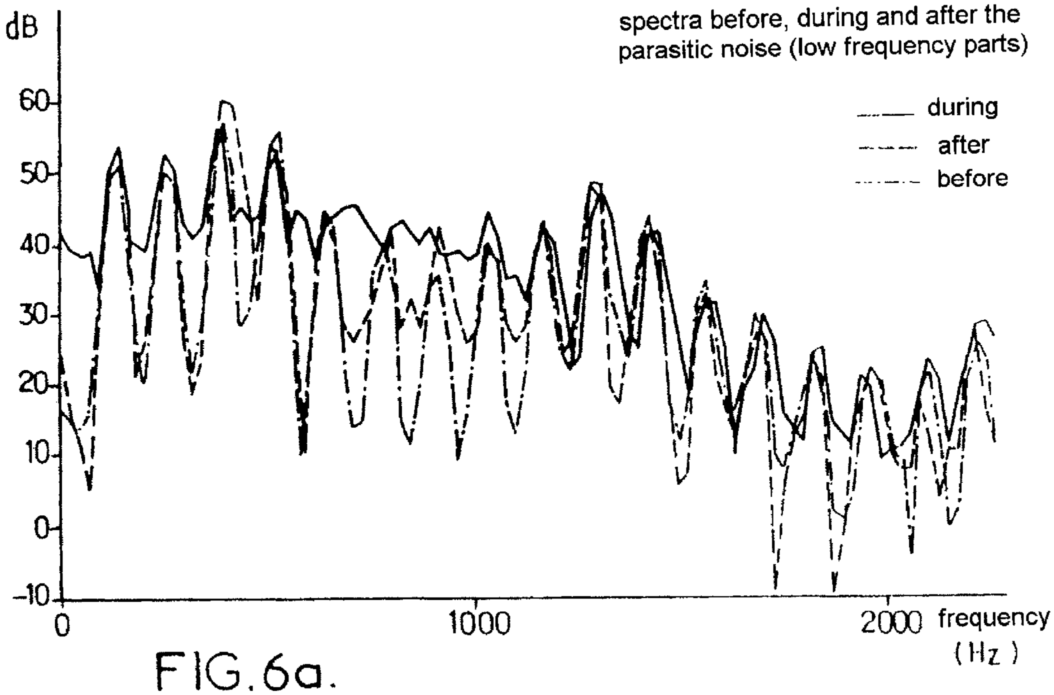
FIGS. 6*a* and 6*b* represent a process for detecting a parasitic hum signal.

As regards the stage of detection of a parasitic hum signal carried out at stage 32, it is indicated that this stage, by reference to FIG. 6*a,* may consist in detecting a parasitic hum signal consisting of pink noise in the frequency band lying between 0 and 1100 Hz and of a substantially constant level in the abovementioned band of frequencies. In FIG. 6*a,* the x-axis is graduated in frequencies and the y-axis in energy level of the signal expressed in decibels. It is observed that, in the abovementioned band of frequencies, a substantially constant level, close to 40 dB, may be brought to light in the presence of a hum.

Figure 6B:
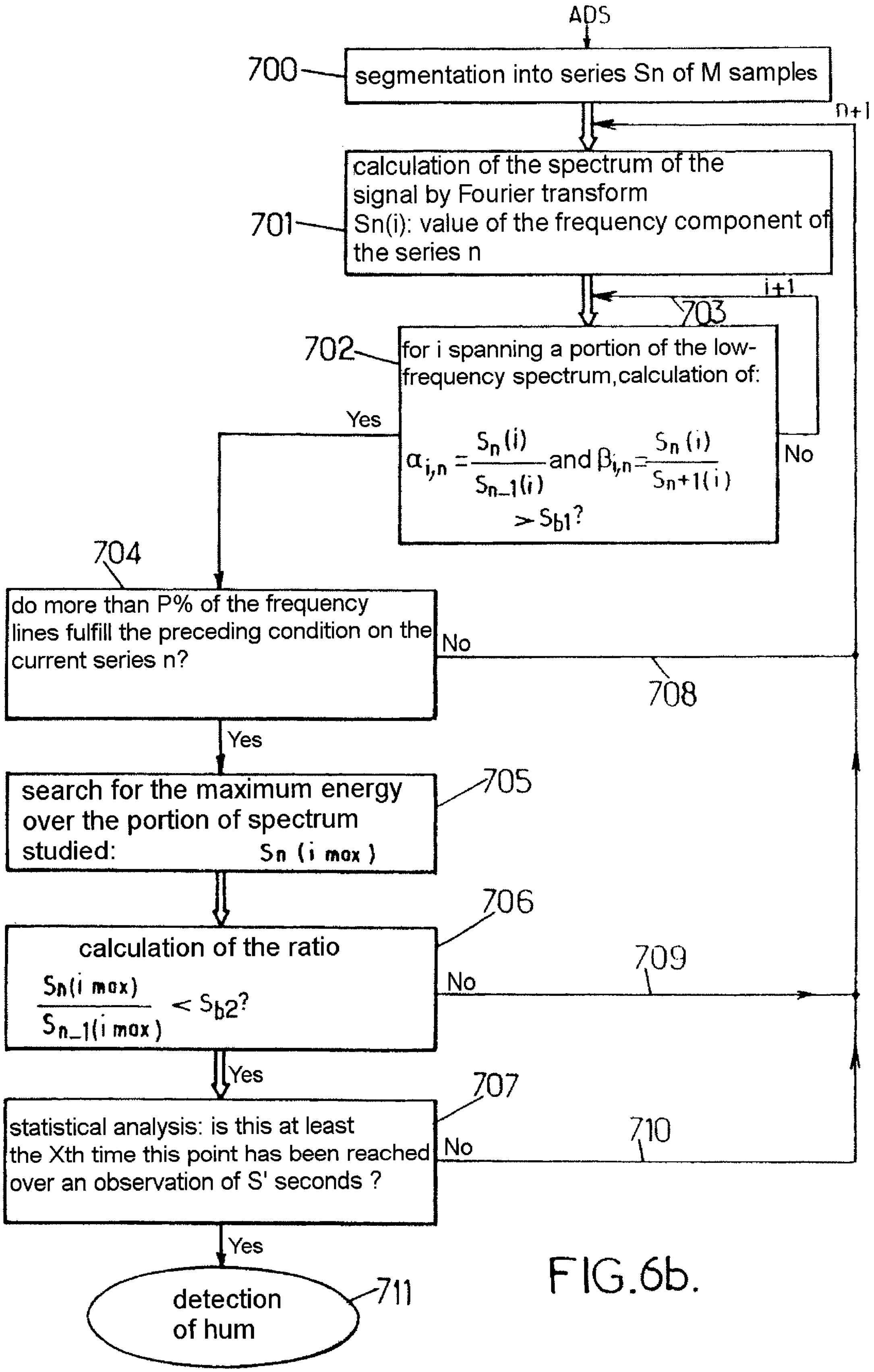

With reference to FIG. 6*b,* the process of revealing a parasitic hum signal may comprise, on at least one left-hand or right-hand channel of this signal, a stage 701 consisting in calculating, on the series of samples of the digital signal ADS, the spectral composition of this signal defined as the value $S_n(i)$ of frequency components in subband, central frequencies $f_i$ where n designates the ranking of the series of samples in question. The stage 701 is followed by a stage 702 for a defined number k of central frequencies $f_i$ of the low-frequency domain, the stage 702 consisting in calculating a first and a second ratio of the values of frequency components in subband for the current series of samples and the preceding series of samples, this first ratio being designated by $$\alpha_{i,n} = \frac{S_n(i)}{S_{n-1}(i)}$$

and the second ratio for the current series of samples and the next series of samples being designated by $$\beta_{i,n} = \frac{S_n(i)}{S_{n+1}(i)}.$$

The stage 702 also consists in comparing the value of the first and second abovementioned ratios with a first hum threshold value, denoted $S_{b1}$. Upon a negative response to the abovementioned comparison, the stage 702 is looped back, 703, by an incrementation of the index i in i=i+1.

Upon a positive response at stage 702, the latter is followed by a stage 704 consisting in submitting the comparison of the first and second ratios to a criterion of proportion of the number p of comparisons satisfied with respect to the totality of the k comparisons carried out for the k central frequencies $f_i$. The stage 704 consists in carrying out a test of verification that P% of the frequency lines satisfy the preceding condition on the current series $S_n$. Upon a negative response to test 704, a loop 708 makes it possible to pass to the next series of samples of ranking n+1.

Upon a positive response to the test 704, a stage 705 is carried out, consisting in discriminating among the values $S_n(i)$ of frequency components in subbands, the maximum value $S_n(i_{max})$ of the values of frequency components relating to the current series of samples.

The stage 705 is itself followed by a stage 706 consisting in calculating the ratio of the maximum value with the corresponding value at the index $i_{max}$ of the spectrum of the preceding series $S_{n-1}(i_{max})$. This ratio is denoted $$M_{n,i} = \frac{S_n(i_{\max})}{S_{n-1}(i_{\max})}.$$

Moreover, this ratio is compared with a second hum threshold value denoted $S_{b2}$ by comparison as to whether it is lower.

Thus, it will be understood that, on at least one channel for transmission, in stereophonic mode, of the digital audio signal ADS, the detection of a parasitic hum signal consists in detecting the existence of a comparison as to whether the first and second ratios $\alpha_{i,n}$ and $\beta_{i,n}$ are higher than the first hum threshold value $S_{b1}$ and the existence of a comparison as to whether the ratio of the maximum values $M_{n,i}$ are less than the second threshold value $S_{b2}$. Following the abovementioned stage 706, a statistical analysis is carried out by repetition of the preceding operations and periodic memory storage, over a defined duration s', of a binary variable for the detection of the existence of a parasitic hum signal. The value 1 is attributed to the binary predetection variable when the higher and lower comparison criteria are satisfied, and the value 0 otherwise.

The statistical analysis consists in counting down, at stage 707, within the defined duration s', the number of occurrences of the value 1 of the predetection binary value and in comparing this number with a third hum threshold value, denoted $S_{b3}$. Hence, when, upon an observation of s' seconds, a number of occurrences is higher than $S_{b3}$, the presence of a parasitic hum signal is revealed when the abovementioned comparison is satisfied.

Figure 7:
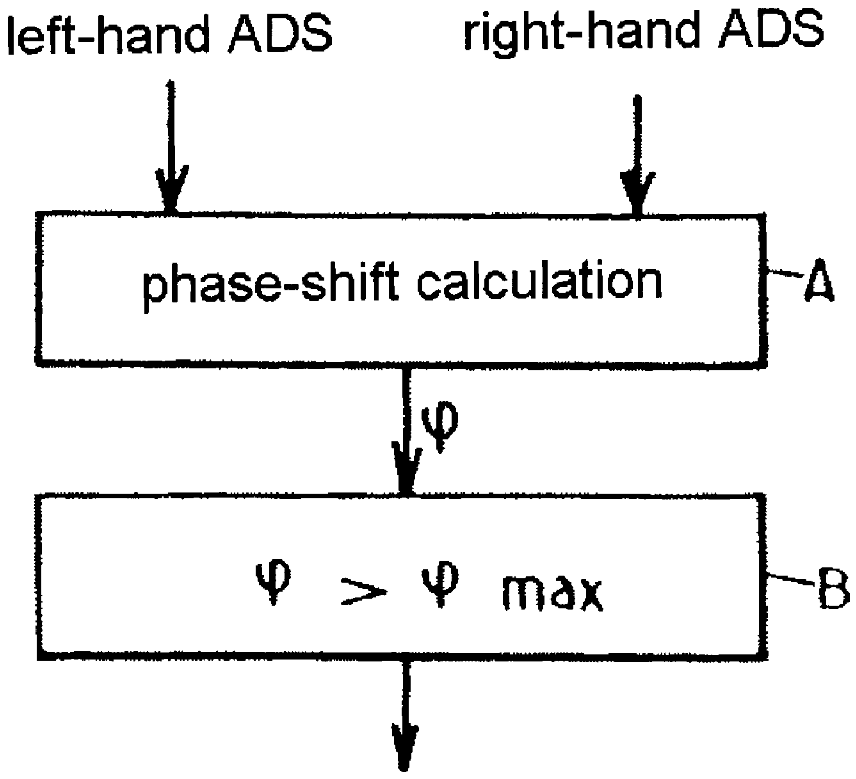
FIG. 7 represents a process for detecting inter-channel phase shift between the digital signals transported by the channels of a stereophonic signal.

As regards the implementing of the stage 33 of calculation of the phase shift d, it is indicated, with reference to FIG. 7, that this stage may consist in calculating, at stage A, the value of the phase shift between channels of the digital audio signal ADS on the basis of the function of intercorrelation of the digital audio signal present on each of the channels, then comparing, at stage B, the phase-shift value d with a threshold value. In FIG. 7, the phase-shift and threshold values are denoted d and $d_{max}$ respectively.

As regards the implementation of the stages for detection of whistling or of saturation 30, of microbreaks 31, of hum 32 and of inter-channel phase shift 33, other procedures can be implemented.

However, the procedures indicated in the present patent application appear to be particularly satisfactory. For a more detailed description of the implementation of these procedures, reference may usefully be made to French patent application No. 99 04179 filed on Mar. 8, 1999 in the name of the holders of the present application.

What is claimed is:

1. A method for continuous monitoring of the quality of sound on distribution, the digital sound being available in stereophonic mode with a digital signal representing at least one right-hand channel and one left-hand channel, wherein said method consists in carrying out a statistical analysis of the content of this digital signal on each of said channels, said statistical analysis consisting:

in segmenting said digital signal in the time domain into successive series of samples, including a defined number of samples, and, when a program of digital sounds is present, in carrying out a spectral analysis of each of the series of samples in order to observe the variations in energy and in envelope of said digital signal in the time and frequency domains, and to calculate an overall quality index;

in calculating, on the basis of said variations in energy and in envelope and of the overall quality index, a final quality index, a value which is bounded and continuous in time, representative of the quality of said digital sound, and wherein calculation, upon the existence of a program of distributed digital sound of the, overall quality index, consists at least in calculating an overall quality index on the basis of at least one frequency criterion and of a time-domain criterion of variation in energy and in envelope.

2. The method as claimed in claim 1, wherein the stage of calculating said overall quality index I(t) is carried out on the basis of a criterion with value Cb(t) linked to the passband, of a criterion with value Cs(t) linked to the stereophonic properties and of a criterion with values Cw(t) linked to the whitening of the time-domain digital signal, said values Cb(t), Cs(t) and Cw(t) consisting of positive real values lying between 0 and 1, said overall quality index I(t) being defined by a linear combination of said values and consisting of a real value lying between 0 and 1.

3. The method as claimed in claim 2, wherein the stage of calculating the value Cb(t) linked to the passband consists, on the basis of a frequency decomposition of the time-domain digital signal, in:

discriminating the existence of a region of silence and, in the absence of a region of silence, segmenting into P subbands of K spectral lines of defined energy, said frequency decomposition of the time-domain digital signal;

calculating, for the left-hand and right-hand channels, the average energy Ei contained in each subband of ranking i;

determining the specific ranking $i_c$ of the subband of corresponding ranking i for which the cut-off frequency occurs, via at least one comparison of the ratio of the energy contained in the last subband, taken as a background-noise reference level, to the energy contained in the other P-1 subbands, with a first threshold value; and, upon a positive response to this comparison, storing in memory the ranking $i_c$=i of the subband of frequencies for which the cut-off frequency is detected, in a table of ranking values;

searching in this table, via a sort program, for the value of the ranking i the occurrence of which is the greatest, then determining the most probable cut-off frequency Fc for the right-hand and left-hand channels;

calculating the average value Q of the left-hand and right-hand cut-off frequencies, normalized by the maximum theoretical cut-off frequency, P, $$Q = \frac{F_c \text{ left} + F_c \text{ right}}{2P}$$

normalizing said average value of the frequencies on psycho-acoustic criterion defined by at least one threshold value (Threshold3) of good audiodigital coding quality and a threshold value (Threshold4) of poor digitalaudio coding quality by shifting and calculation of a reduced value constituting said value Cb(t) linked to the passband and satisfying the relation.

4. Method as claimed in claim 3, wherein the stage consisting in determining the specific ranking $i_c$ of the subband of corresponding ranking i for which the cut-off frequency occurs includes, in addition to a first comparison of the ratio Ei/Ep of the energy contained in the last subband to the energy contained in the other P-1 subbands with a first threshold value, Threshold1, upon a positive response to this first comparison, a second stage of comparison of the ratio Ei/Ei+1, of the energy of the subband of ranking i to the energy of the subband of next ranking i+1 with a second threshold value, Threshold2, the following stage of memory-storage of the ranking $i_c$=i of the subband of frequencies for which the cut-off frequency is detected being conditioned by the positive response to said first and second comparisons, the negative response to said first and second comparison tests being followed, if i≠1, by a return to the first comparison test and by a call to the stage for searching for the ranking ic the occurrence of which is the greatest otherwise.

5. The method as claimed in claim 2, wherein the stage of calculating the value Cs(t) linked to the stereophonic properties of the time-domain digital signal consists, on the basis of a frequency decomposition into spectral lines of ranking k of the time-domain digital signal, in:

calculating, for each spectral line of ranking k, a factor Qk representative of the stereophonic quality of the signal from frequency spectra $S_k^G$ of the left-hand channel and $S_k^D$ of the right-hand channel, standardized difference in the energies of the right-hand and left-hand channels of the form $$Q_k = \frac{|S_k^G - S_k^D|}{S_k^G + S_k^D},$$

determining the percentage R(t) of the spectral lines belonging to a given frequency band ΔF for which the factor $Q_k$ exceeds a defined threshold value, $S_1$, R(t)=n/K, n being the number of times when $Q_k > s_1 \forall k \in \Delta F$;

correcting the value of the percentage R(t) by a specific function A such that $0 \leqq A(R(t)) \leqq 1$, so as to generate a percentage value M(t), the average of a defined number P of corrected percentage values $$M(t) = \frac{1}{P}\sum_{t=1}^{P} A(R(t))$$

determining, in a time-domain window of defined duration, the number of times F when an alarm-threshold value $S_2$ has been crossed by the corrected-percentage value A(R(t));

calculating the value Cs(t) on the basis of a function of the said average value, of the form:

$$Cs(t) = (M(t))^{\frac{1}{(F+1)}}.$$

6. The method as claimed in claim 2, wherein the stage of calculating the value Cw(t) linked to the whitening of the time-domain digital signal consists, on the basis of said time-domain signal, for each of the channels, in the absence of detection of a region of silence:

in calculating the covariance matrix (Rg, Rd) of the input signal and of a random signal lying between the values −1 and +1;

in calculating the matrix which is the inverse of the covariance matrix;

in subjecting the input signal to an anti-aliasing low-pass filtering and to the division by a factor two, in order to generate a left-hand and right-hand input matrix (Eg, Ed);

in calculating, from the left-hand and right-hand input matrix, a left-hand and right-hand output matrix (Sg, Sd);

in calculating, from the left-hand and right-hand input and output matrices, a ratio between the energy of the output signal and the energy of the input signal;

in calculating, on the basis of the last L ratio values, an average ratio (r) between the energy of the output signal and the energy of the input signal;

in subjecting the value of this average ratio to a comparison as to whether it is higher than a first threshold value $S'_1$ and lower than a second threshold value $S'_2$;

in calculating the value Cw(t) linked to the whitening as the ratio, increased by one unit, of the difference between the average ratio r and the second threshold value S'hd 2to the difference between the second $S'_2$ and the first $S'_1$ threshold value.

7. A method for continuous monitoring of the quality of sound on distribution, the digital sound being available in stereophonic mode with a digital signal representing at least one right-hand channel and one left-hand channel, wherein said method consists in carrying out a statistical analysis of the content of this digital signal on each of said channels, said statistical analysis consisting:

in segmenting said digital signal in the time domain into successive series of samples, including a defined number of samples, and, when a program of digital sounds is present, in carrying out a spectral analysis of each of the series of samples in order to observe the variations in energy and in envelope of said digital signal in the time and frequency domains, and to calculate an overall quality index;

in calculating, on the basis of said variations in energy and in envelope and of the overall quality index, a final quality index, a value which is bounded and continuous in time, representative of the quality of said digital sound, and wherein said series of samples consist of series of samples featuring a degree of overlap which is a ratio of the number of samples common to two consecutive series to the number of samples constituting each series of samples, this degree lying between 0 and 75%.

8. A method for continuous monitoring of the quality of sound on distribution, the digital sound being available in stereophonic mode with a digital signal representing at least one right-hand channel and one left-hand channel, wherein said method consists in carrying out a statistical analysis of the content of this digital signal on each of said channels, said statistical analysis consisting:

in segmenting said digital signal in the time domain into successive series of samples, including a defined number of samples, and, when a program of digital sounds is present, in carrying out a spectral analysis of each of the series of samples in order to observe the variations in energy and in envelope of said digital signal in the time and frequency domains, and to calculate an overall quality index;

in calculating, on the basis of said variations in energy and in envelope and of the overall quality index, a final quality index, a value which is bounded and continuous in time, representative of the quality of said digital sound, and wherein calculation of the final quality index on the basis of the said variations in energy and in envelope and of the overall quality index consists at least:

in detecting the existence on said digital signal of at least one disturbance in transmission of said digital signal, and in assigning to the existence of this disturbance a specific weighting coefficient, representative of the contribution of this disturbance to the degradation of the quality of said digital signals, the value of this weighting coefficient being equal to 1 otherwise;

in weighting the value of said overall quality index by the value of the product of the set of weighting coefficients, in order to obtain a weighted overall quality index;

in detecting the value of an inter-channel phase shift and in assigning a specific phase-shift criterion value to this phase-shift value when this phase-shift value is greater than zero, and a phase-shift criterion value equal to zero otherwise;

in determining said final quality coefficient by comparison of the difference between said weighted quality coefficient and said phase-shift criterion value with the zero value and in attributing a value equal to 1 to said overall quality coefficient in the absence of a program of distributed digital sound.

9. The method as claimed in claim 8, wherein the stage consisting in detecting the existence on the said digital signal of at least one transmission disturbance consists in detecting a disturbance chosen from among the whistling or saturation, micro cut-off and hum disturbances respectively.

* * * * *

UNITED STATES PATENT AND TRADEMARK OFFICE

CERTIFICATE OF CORRECTION

PATENT NO. : 6,804,566 B1 
DATED : October 12, 2004
INVENTOR(S) : Catherine Colomes et al.

It is certified that error appears in the above-identified patent and that said Letters Patent is hereby corrected as shown below:

Title page,
Item [75], Inventors, replace "Eric Monteux, Rennes" with -- Eric Monteux, Chapelle Chaussee --;

Column 19,
Line 10, replace "sound of the," with -- sound, of the --;

Column 20,
Line 37, replace "$0 \leqq A(R(t)) \leqq 1$" with -- $0 \leq A(R(t)) \leq 1$ --; and Column 21,
Line 16, replace "S'hd 2to" with -- $S'_2$ to --.

Signed and Sealed this

Twenty-seventh Day of September, 2005

JON W. DUDAS
*Director of the United States Patent and Trademark Office*